United States Patent
Ryu et al.

(10) Patent No.: US 11,003,275 B2
(45) Date of Patent: May 11, 2021

(54) TOUCH SENSING AND FORCE SENSING SENSOR, TOUCH SENSING DEVICE INCLUDING THE SENSOR, AND AN ELECTRONIC DEVICE INCLUDING THE TOUCH SENSING DEVICE

(71) Applicant: Samsung Electro-Mechanics Co., Ltd., Suwon-si (KR)

(72) Inventors: Je Hyuk Ryu, Suwon-si (KR); Joo Yul Ko, Suwon-si (KR); Byung Joo Hong, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/807,336

(22) Filed: Mar. 3, 2020

(65) Prior Publication Data

US 2021/0034186 A1 Feb. 4, 2021

(30) Foreign Application Priority Data

Aug. 2, 2019 (KR) .......................... 10-2019-0094470
Dec. 17, 2019 (KR) .......................... 10-2019-0168650

(51) Int. Cl.
G06F 3/041 (2006.01)
G06F 3/044 (2006.01)
G06F 1/16 (2006.01)

(52) U.S. Cl.
CPC .......... *G06F 3/0414* (2013.01); *G06F 1/1626* (2013.01); *G06F 3/0412* (2013.01);
(Continued)

(58) Field of Classification Search
CPC .... G06F 1/1626; G06F 3/0412; G06F 3/0446; G06F 2203/04106; G06F 3/0414; G06F 3/0418

See application file for complete search history.

(56) References Cited

U.S. PATENT DOCUMENTS

2009/0219255 A1 9/2009 Woolley et al.
2010/0045630 A1* 2/2010 Gu .................... G06F 3/0412
345/174

(Continued)

FOREIGN PATENT DOCUMENTS

JP 2012-168747 A 9/2012
JP 2015-95865 A 5/2015

(Continued)

OTHER PUBLICATIONS

Korean Office Action dated Apr. 24, 2020 in counterpart Korean Patent Application No. 10-2019-0168650 (6 pages in English and 6 pages in Korean).

*Primary Examiner* — Hong Zhou
(74) *Attorney, Agent, or Firm* — NSIP Law

(57) ABSTRACT

A touch sensing device includes a conductor disposed inside a housing and spaced apart from the housing by a predetermined first distance, a touch member integrated with the housing and including an inductor element disposed inside the housing spaced apart from the conductor by a predetermined second distance, an oscillation circuit including the inductor element, and configured to generate an oscillating signal having different frequency change characteristics for each of a touch input and a touch-force input through the touch member, and an operation detection circuit configured to detect one or more of the touch input and the touch-force input in response to the frequency change characteristics of the oscillating signal from the oscillation circuit.

20 Claims, 14 Drawing Sheets

(52) U.S. Cl.
CPC .......... G06F 3/0418 (2013.01); G06F 3/0446 (2019.05); *G06F 2203/04106* (2013.01)

(56) References Cited

U.S. PATENT DOCUMENTS

| | | | |
|---|---|---|---|
| 2011/0018556 A1* | 1/2011 | Le .................... | H03K 17/9622 |
| | | | 324/654 |
| 2013/0098170 A1* | 4/2013 | Lee ................... | G01L 9/007 |
| | | | 73/862.626 |
| 2015/0130649 A1 | 5/2015 | Itakura et al. | |
| 2016/0216798 A1* | 7/2016 | Kim ................... | G06F 3/0445 |
| 2018/0081221 A1* | 3/2018 | Liu .................... | G06F 3/0362 |
| 2018/0093695 A1 | 4/2018 | Hattori et al. | |
| 2018/0120364 A1 | 5/2018 | Lee et al. | |
| 2018/0202873 A1* | 7/2018 | Bonifas ............... | G01L 1/14 |
| 2019/0101417 A1* | 4/2019 | Patel .................. | H03K 17/954 |
| 2020/0133455 A1* | 4/2020 | Sepehr ................ | G06F 3/0412 |

FOREIGN PATENT DOCUMENTS

| | | |
|---|---|---|
| KR | 2002-0077836 A | 10/2002 |
| KR | 10-2009-0120709 A | 11/2009 |
| KR | 10-2010-0105555 A | 9/2010 |
| KR | 10-2011-0087004 A | 8/2011 |
| KR | 10-2011-0087014 A | 8/2011 |
| KR | 10-2018-0046833 A | 5/2018 |

* cited by examiner

<FORCE IS APPLIED: D1<D>

No Touch, No Force

TOUCH SENSING AND FORCE SENSING SENSOR, TOUCH SENSING DEVICE INCLUDING THE SENSOR, AND AN ELECTRONIC DEVICE INCLUDING THE TOUCH SENSING DEVICE

CROSS-REFERENCE TO RELATED APPLICATIONS

This application claims the benefit under U.S.C. 119(a) of Korean Patent Application Nos. 10-2019-0094470 filed on Aug. 2, 2019, and 10-2019-0168650 filed on Dec. 17, 2019, in the Korean Intellectual Property Office, the entire disclosures of which are incorporated herein by reference for all purposes.

BACKGROUND

1. Field

The present disclosure relates to a touch sensing device with touch sensing and force sensing implemented using a single sensor and an electronic device including the same.

2. Description of the Background

In general, thinner, simpler and cleaner designs of wearable devices of an electronic product are favored, and the mechanical switches according to the conventional art are disappearing. This trend may be made possible by the implementation of dustproof and waterproof technologies, and the development of an integrated model of smooth design.

Currently, technologies such as a touch on metal (ToM) technology for touching a top of a metal, capacitor sensing using a touch panel, a micro-electro-mechanical-system (MEMS), and a micro strain gauge are being developed. Furthermore, the force function is being developed.

In the case of the mechanical switch according to the conventional art, to realize a switch function, a large size and space may be required internally. Moreover, in terms of appearance, a clumsy design may be provided and a large space may be required due to the shape protruding outwardly or a structure not integrated with the external case.

Moreover, there may be a risk of electric shock due to direct contact of the mechanical switch, electrically connected, and in particular, it may be difficult to provide a dustproof and waterproof function due to the structure of the mechanical switch.

Moreover, in a switch device according to the conventional art, it may be difficult to simultaneously perform a touch sensing function and a force sensing function.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a touch sensing device includes a conductor disposed inside a housing and spaced apart from the housing by a predetermined first distance, a touch member integrated with the housing and comprising an inductor element disposed inside the housing spaced apart from the conductor by a predetermined second distance, an oscillation circuit including the inductor element, and configured to generate an oscillating signal having different frequency change characteristics for each of a touch input and a touch-force input through the touch member, and an operation detection circuit configured to detect one or more of the touch input and the touch-force input in response to the frequency change characteristics of the oscillating signal from the oscillation circuit.

The oscillation circuit may include an inductance circuit including the inductor element mounted on a substrate attached to an inner side surface of the touch member, a capacitance circuit including a capacitor element mounted on the substrate and connected to the inductance circuit, an amplification circuit configured to generate an oscillating signal having a resonant frequency by the inductance circuit and the capacitance circuit.

The conductor may be supported by a bracket installed inside the housing.

The oscillation circuit may be configured to generate the oscillating signal having a first frequency change characteristic according to a change in capacitance in touch input through the touch member, and configured to generate an oscillating signal having a second frequency change characteristic according to the change in capacitance and a change in inductance in touch-force input through the touch member.

The operation detection circuit may include a digital frequency converter configured to generate a count value by counting a clock signal using the oscillating signal from the oscillation circuit, and an operation detector configured to detect one or more of a touch input and a touch-force input in response to the count value input by the digital frequency converter.

The digital frequency converter may include a frequency down converter configured to generate a divided reference clock signal by dividing a reference clock signal using a reference frequency divide ratio, a cycle timer configured to generate a cycle count value by counting one cycle time of the divided reference clock signal, received by the frequency down converter, using the oscillating signal, and a cascaded integrator comb (CIC) filter circuit configured to generate the count value by performing accumulated amplification on the cycle count value received by the cycle timer.

The operation detector may include a delay circuit configured to output a delay count value, by delaying the count value, received by the digital frequency converter, by a time determined in response to a delay control signal, a subtraction circuit configured to output a difference value generated by subtracting the count value from the delay count value from the delay circuit, and a touch-force slope detection circuit configured to output a touch detection signal having different types of detection information in response to a comparison result, by comparing the difference value received from the subtraction circuit with each of a preset touch threshold and a preset force threshold.

The touch-force slope detection circuit may include a slope detector configured to output a first enable signal in an active state in response to a falling difference value, and output a second enable signal in an active state in response to a rising difference value, by determining whether the difference value is falling or rising, a touch slope detector configured to generate a touch detection signal in response to the difference value equal to or less than a touch threshold of a falling section for a predetermined time, when the first enable signal is in the active state, a force slope detector configured to generate a force detection signal in in response to the difference value equal to or greater than a force threshold of a rising section for a predetermined time, when the second enable signal is in the active state, and a detection signal generator configured to generate a touch detection signal comprising different types of detection information in response to the touch detection signal and the force detection signal.

A portable electronic device may include the touch sensing device, a controller, and a touchscreen.

In response to one or more of the touch input and the touch-force input, the controller may be configured to implement one or more of control power, navigate content display of the touch screen, lock the portable electronic device, control volume of a speaker, and control color of the touch screen.

In another general aspect, an electronic device includes a touch member integrated with a housing, a conductor disposed inside the housing and spaced apart from the housing by a predetermined first distance, an inductor element disposed inside the touch member and spaced apart from the conductor by a predetermined second distance, an oscillation circuit including the inductor element, and generating an oscillating signal having different frequency change characteristics for each of a touch input and a touch-force input through the touch member, and an operation detection circuit detecting one or more of the touch input and the touch-force input in response to the frequency change characteristics of the oscillating signal from the oscillation circuit.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
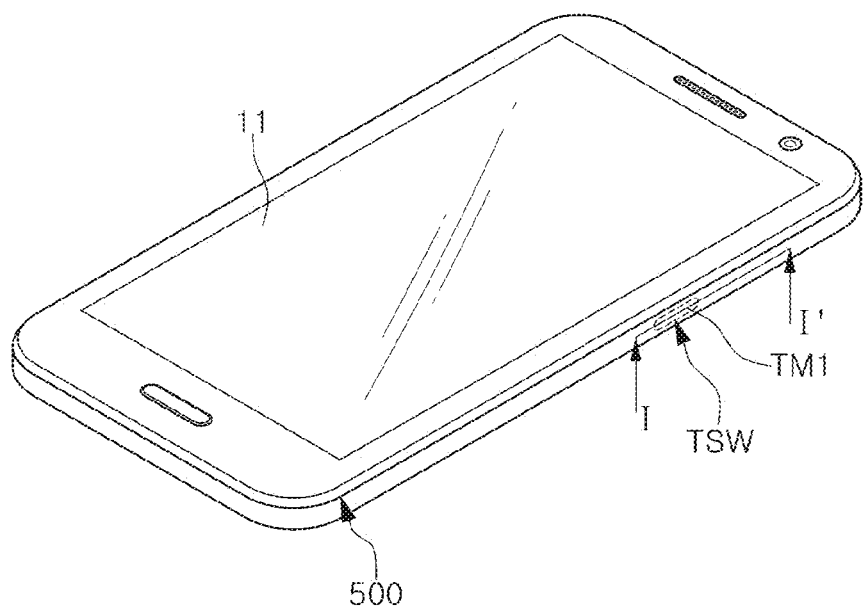
FIG. 1 is a view illustrating one or more examples of an outer case of an electrical device according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

The examples disclosed herein provide a touch sensing device and an electronic device including the same, and the touch sensing device is capable of recognizing touch while the touch sensing and the touch-force sensing are distinguished using a single sensor, by implementing all of the capacitive sensing (touch sensing) and the inductive sensing (force sensing), in a single sensor.

FIG. 1 is a view illustrating one or more examples of an outer case of an electrical device according to an embodiment of the present disclosure.

Referring to FIG. 1, an electrical device 10 according to an embodiment of the present disclosure includes a touch-screen 11, a housing 500, and a touch operator TSW.

The touch operator TSW may include at least one touch member TM1, for example, for replacing a mechanical button.

For example, referring to FIG. 1, the electrical device 10 may be a portable device such as a smartphone, or may be a wearable device such as a smartwatch, but is not limited to a specific device, and may be a portable or wearable electric device, or an electrical device having a switch for operation control.

The housing 500 may be an outer case exposed to an outside of the electrical device. For example, when the touch sensing device is applied to a mobile device, the housing may be a cover disposed on a side (a side surface) of the electrical device 10. For example, the housing 500 may be integrated with a cover disposed on the rear of the electrical device 10, or may be separated from the cover disposed on the rear of the electrical device 10.

The touch operator TSW may be disposed in the housing 500 of the mobile device, but is not limited thereto. The touch sensing device 50 may be disposed in the housing of the electrical device (See FIG. 2). Referring to FIG. 1, the touch operator TSW may be disposed in a cover of a mobile device. In this case, the cover may be a cover other than a touchscreen, for example, a side cover, a rear cover, a cover formed in a portion of a front side, or the like. For convenience of description, an example of the housing will be described in the case of being disposed in the side cover of an electrical device such as a smartphone, but is not limited thereto.

The touch operator TSW, a portion of the housing 500 integrated with the housing 500, may include at least one touch member capable of sensing touch, force, or touch-force.

The description of the force can be understood as the description of force following a touch.

For each drawing of the present disclosure, unnecessary redundant explanations may be omitted for components having the same reference numerals and the same function, and differences for each drawing will be explained.

Figure 2:
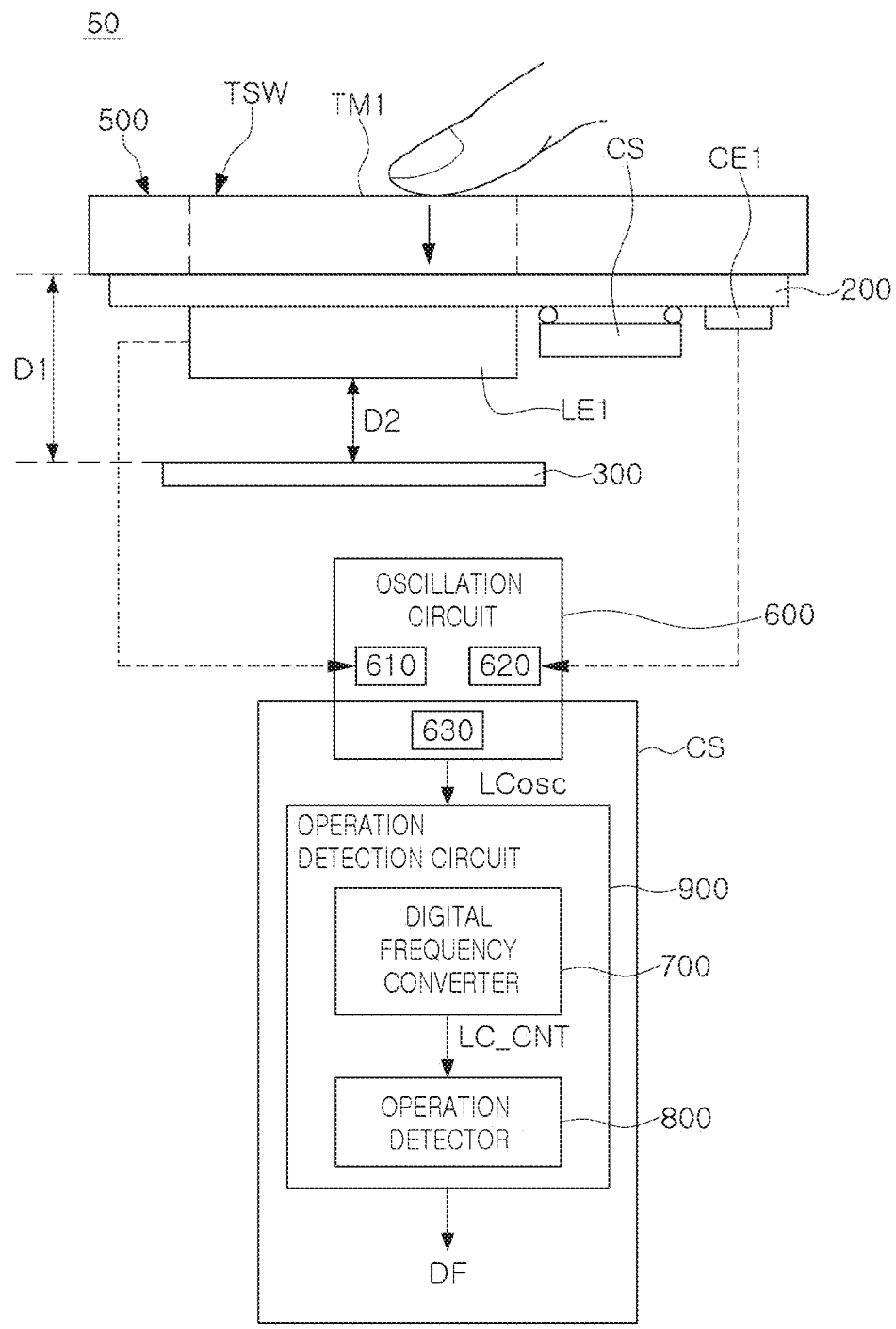
FIG. 2 is a view illustrating one or more examples of a touch sensing device having a cross-sectional structure taken along line I-I' of FIG. 1.

FIG. 2 is a view illustrating one or more examples of a touch sensing device having a cross-sectional structure taken along line I-I' of FIG. 1. Referring to FIGS. 1 and 2, one or more examples of a touch sensing device according to an embodiment of the present disclosure includes a touch operator TSW, a conductor 300, an inductor element LE1, an oscillation circuit 600, and an operation detection circuit 900.

The touch operator TSW may include a touch member TM1 integrated with the housing 500.

The conductor 300 is disposed inside the housing 500 and spaced apart from the housing by a predetermined first distance, and conductor 300 may be spaced apart from the inductor element LE1 by a predetermined second distance D2, inside the housing 500.

The inductor element LE1 is disposed in the touch member TM1, and may be spaced apart from the conductor 300 by a predetermined second distance D2.

The oscillation circuit 600 includes the inductor element LE1 and a capacitor element CE1, disposed in the touch member TM1, and may generate an oscillating signal LCosc having different frequency change characteristics for each of a touch input and touch-force input through the touch member TM1.

The operation detection circuit 900 may detect at least one of a touch input and touch-force input based on frequency change characteristics of the oscillating signal LCosc from the oscillation circuit 600 to output a detection signal DF.

The oscillation circuit 600 may include an inductance circuit 610, a capacitance circuit 620, and an amplification circuit 630.

The inductance circuit 610 may include an inductor element LE1 mounted on a substrate 200 attached to an inner side surface of the touch member TM1.

The capacitance circuit 620 may include a capacitor element CE1 mounted on the substrate 200 and connected to the inductance circuit 610.

The amplification circuit 630 may generate an oscillating signal having a resonant frequency by the inductance circuit 610 and the capacitance circuit 620.

The operation detection circuit 900 may include a digital frequency converter 700 and an operation detector 800.

The digital frequency converter 700 may generate the count value by counting a reference clock signal CLK_ref using the oscillating signal LCosc from the oscillation circuit 600.

The operation detector 800 may detect one of a touch input and touch-force input based on a count value LC_CNT input by the digital frequency converter 700.

Figure 3:
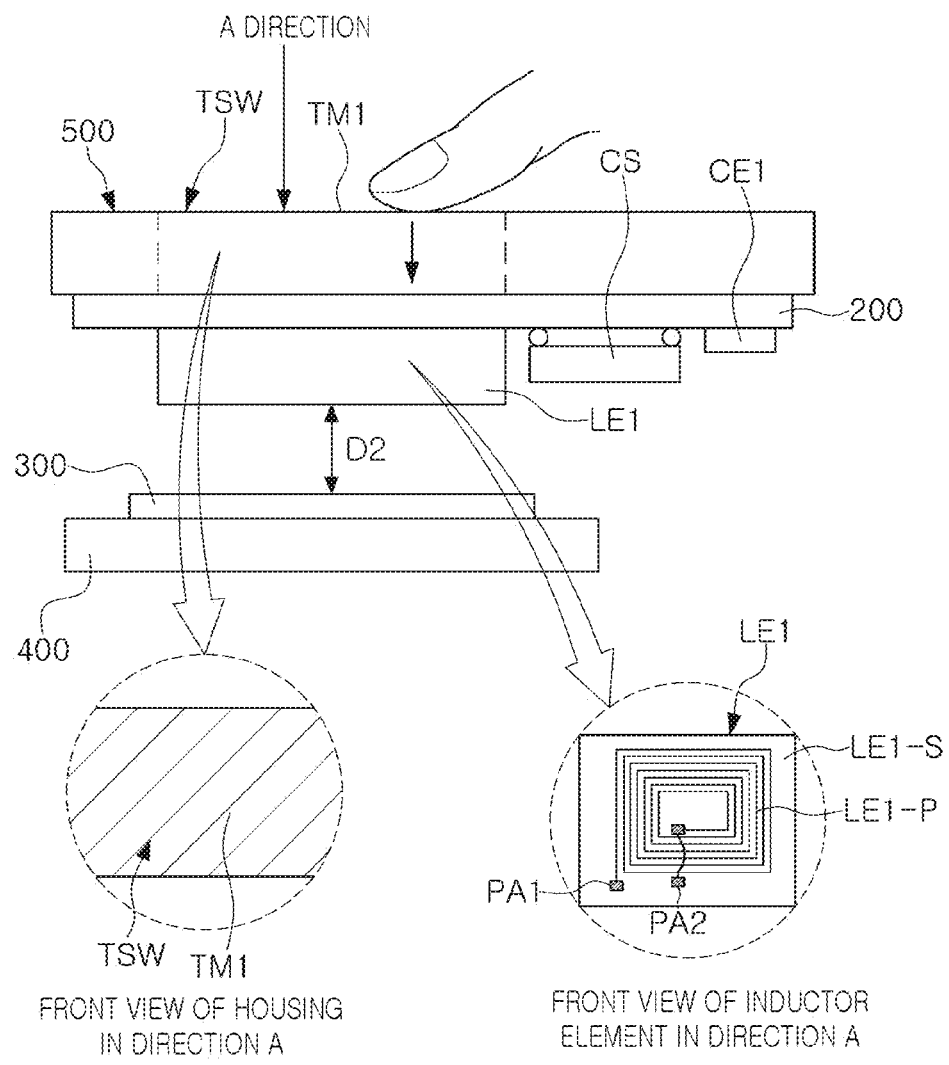
FIG. 3 is a view illustrating one or more examples of a touch sensing device having a cross-sectional structure taken along line I-I' of FIG. 1.

FIG. 3 is a view illustrating one or more examples of a touch sensing device having a cross-sectional structure taken along line I-I' of FIG. 1.

Referring to FIGS. 1 to 3, in a touch sensing device according to an embodiment of the present disclosure, the touch operator TSW includes a touch member TM1 integrated with the housing 500 of the electrical device.

For example, one surface of the substrate 200 is attached to an inner side surface of the touch member TM1, the capacitor element CE1 may be mounted on another surface of the substrate 200 opposite to the one surface, and may be included in the capacitance circuit (620 of FIG. 2). The inductor element LE1 may be mounted on the substrate 200, and may be included in the inductance circuit (610 of FIG. 2). For example, the capacitor element CE1 may be a multilayer ceramic capacitor (MLCC), or the like, while the inductor element LE1 may be a sensing coil, or the like.

Alternatively, a circuit unit CS may be mounted on the other surface of the substrate 200. The circuit unit CS may include some circuits (for example, an amplification circuit 630) of the oscillation circuit 600 and the operation detection circuit 900. For example, the circuit unit CS may be an integrated circuit (IC).

For example, the inductor element LE1 is spaced apart from the conductor 300 by a predetermined second distance D2, and the predetermined second distance D2 may be set in advance to respond to the force input through the touch member TM1.

For example, the inductor element LE1 and the capacitor element CE1 may be mounted on the substrate 200 attached to an inner side surface of the touch member TM1. Here, a mounting surface of the substrate 200 may be an opposite surface to a surface opposing the inner side surface of the touch member. For example, the substrate 200 may be a flexible printed circuit board (FPCB), and may be various types of printed circuit boards (PCBs) other than the FPCB.

Moreover, the touch sensing device may include a conductor 300 disposed at a predetermined second distance D2 from the inductor element LE1. The conductor 300 may be attached to an internal structure of an electrical device to which a touch sensing device is applied, and is not limited to a specific structure, for example, a metal sheet or thin film, for example, a Cu film, a conductive polymer resin, or indium tin oxide (ITO), as long as the predetermined second distance D2 from the inductor element LE1 is maintained.

The circuit unit CS, the inductor element LE1, and the capacitor element CE1 may be electrically connected to each other through the substrate 200.

Referring to the front view of the housing of FIG. 3 in direction A, for example, the front view of the side of the housing 500 in FIG. 1, the housing 500 may be formed of a conductor such as a metal, by way of example. The touch member TM1 may be integrated with the housing 500, and may be formed of a conductor such as a metal.

Referring to the front view of the inductor element of FIG. 3 in direction A, the inductor element LE1 may include a coil pattern LE1-P in a winding type between a first connection pad PA1 and a second connection pad PA2, by way of example, and the coil pattern LE1-P may be a PCB pattern formed on a coil substrate LE1-S. The first connection pad PA1 and the second connection pad PA2 may be electrically connected to the circuit unit CS and the capacitor element CE1 through the substrate 200.

The structure of the touch sensing device, illustrated in FIG. 3, is only an example, and is not limited thereto.

As described previously, the inductor element LE1 is spaced apart from the conductor 300 by a predetermined second distance D2, a shape of the inductor element LE1 need not be limited to one specific form, the inductor element LE1 may have various patterns such as a circular shape or a quadrangular shape, and the inductor element may be configured as a FPCB by a PCB itself and may also be a chip inductor.

In other words, in an embodiment of the present disclosure, a structure capable of capacitive and inductive sensing in a single sensing structure is presented, and each sensing concept is described.

For example, when the touch member TM1 of the housing 500 is pushed, the inductor element LE1 attached to the touch member TM1 is pushed. Thus, a change in the second distance D2 occurs between the inductor element LE1 and the conductor 300, and inductive sensing is possible due to a change in inductance according to such a distance change.

Then, when the touch member TM1 is touched, while the parasitic capacitor is formed on the substrate 200 disposed between the inductor element LE1 and the touch member TM, the total capacitance is changed by the capacitance generated by a touched human body (for example, the hand). Thus, capacitive sensing is possible according to such a change in the total capacitance.

As described, due to the change in capacitance by touch input to the touch member and the change in inductance by force input, the resonant frequency by the LC resonance of the oscillation circuit 600 is changed. When the change characteristics of the resonant frequency are sensed, the touch input and the touch-force input may be recognized.

As disclosed herein, the touch input refers to lowering of the resonant frequency by a parasitic capacitance generated by a touch when a conductor such as a human hand is adjacent to or touching a touch member of the housing. The force input refers to increasing of the resonant frequency by a change in an inductance caused by a distance change, when the distance change occurs between the touch member of the housing and the inductor element, by force in which a conductor such as a human hand or a non-conductor such as plastic presses the touch member of the housing.

The structure of the touch sensing device according to an embodiment of the present disclosure is not limited to that in FIG. 3, and any structure could be included in the concept of the present disclosure, as long as the structure is capable of inductive sensing due to a distance change by force, and capacitive sensing due to formation of parasitic capacitance between the touch member and the inductor element by the touch, in a structure in which a predetermined second distance D2 between the inductor element LE1 and the conductor 300 is maintained.

Another embodiment of the touch sensing device included in the concept of the present disclosure will be described with reference to FIG. 4, and the descriptions overlapping with those of FIG. 3 will be omitted and differences will be mainly described.

For each drawing of the present disclosure, unnecessary redundant explanations may be omitted for components having the same reference numerals and the same function, and differences for each drawing will be explained.

Figure 4:
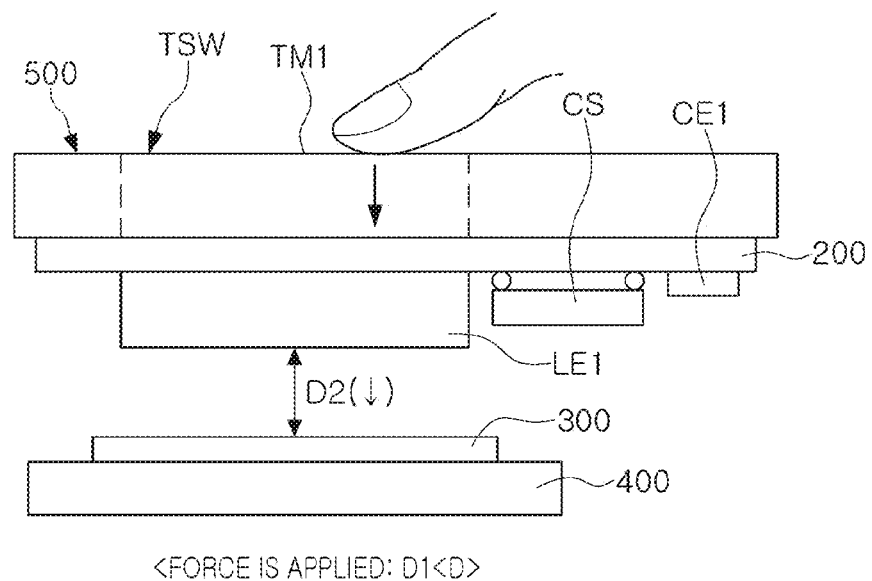
FIG. 4 is a view illustrating one or more examples of a touch sensing device having a cross-sectional structure taken along line I-I' of FIG. 1.

FIG. 4 is a view illustrating one or more examples of a touch sensing device having a cross-sectional structure taken along line I-I' of FIG. 1.

Referring to FIG. 4, the conductor 300 may be supported by a bracket 400 installed inside the housing.

For example, the bracket 400 may be attached to or combined with an internal structure or a housing of an electrical device to which an embodiment of the present disclosure is applied, to be supported thereby, in order to maintain a predetermined second distance D2 between the inductor element LE1 and the conductor 300 by supporting the conductor 300.

In detail, an inductor element LE1 is mounted on the other surface of the substrate 200 attached to an inner side surface of the touch member TM1 of the housing 500, and the conductor 300, for example, a metal, is disposed therein at a predetermined second distance D2 from the inductor element LE1. Thus, according to touch or force applied to the touch member TM1, capacitive sensing (touch sensing) and inductive sensing (force sensing) may be applied, so one sensing structure could recognize both touch and touch-force while distinguishing the touch and the touch-force.

As an example, when a human body comes close to or lightly touches an outer side surface of the touch member TM1, capacitive sensing is performed to change (for example, to increase) a total capacitance value. In this regard, the resonant frequency of the oscillating signal may be lowered as in Equation 1 below.

As another example, when the human body applies predetermined force to the outer side surface of the touch member TM1, the touch member is bent inwardly. Accordingly, the inductor element LE1 is closer to the conductor 300, and thus the distance between the inductor element LE1 and the conductor 300 is reduced, thereby performing inductive sensing. Thus, the inductance due to an eddy current is changed (for example, decreased), so the resonant frequency of the oscillating signal may be increased.

In the case of using an integrated sensor structure capable of performing both types of sensing described above, based on a finally output detection signal, the touch, the force, and the touch-force may be distinguished and recognized.

Figure 5:
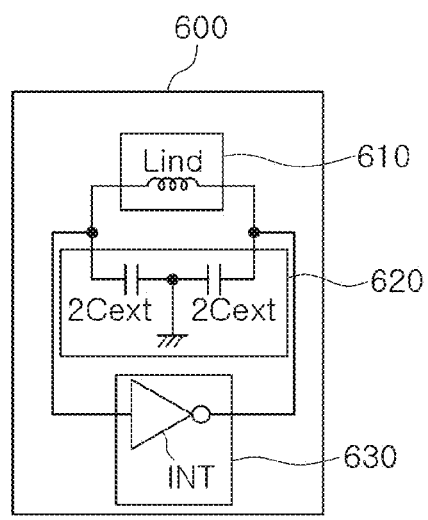
FIG. 5 is a view illustrating one or more examples of an oscillation circuit.

FIG. 5 is a view illustrating one or more examples of an oscillation circuit.

Referring to FIG. 5, the inductance circuit 610 includes an inductance Lind of an inductor element LE1.

The capacitance circuit 620 may include the capacitance Cext (the capacitance may be represented as a circuit including 2Cext and 2Cext) of the capacitor element CE1.

The amplification circuit 630 may include an inverter INT to maintain a resonant frequency by the inductance circuit 610 and the capacitance circuit 620.

For example, referring to FIGS. 2 and 5, the oscillation circuit 600 includes an inductance circuit 610 including the inductance Lind of the first inductor element LE1, and a capacitance circuit 620 including the capacitance Cext of the capacitor element CE1.

In an embodiment of the present disclosure, the oscillation circuit 600 may include an LC resonant circuit, by way of example, but it is not limited thereto, and may generate an oscillating signal based on the capacitance changed when a conductor such as the hand of a human body touches a touch member, and the inductance changed according to the force (pressing force) of the conductor (a metal) or the non-conductor.

The oscillation circuit 600 may include a parallel resonant circuit including an inductance circuit 610 including the inductance Lind of the inductor element LE1, as described previously, and a capacitance circuit 620 including the capacitance Cext (2Cext and 2Cext) of the capacitor element CE1.

For example, when there is no touch in the touch member TM1 (No touch), the first resonant frequency fres1 of the oscillation circuit 600 may be expressed as Equation 1 below.

$$\text{fres1} \approx \frac{1}{2\pi} \text{squrt}(Lind \times Cext) \qquad \text{Equation 1}$$

In Equation 1, ≈ refers to 'the same' or 'similar', wherein the 'similar' refers to further including of another value.

Figure 6:
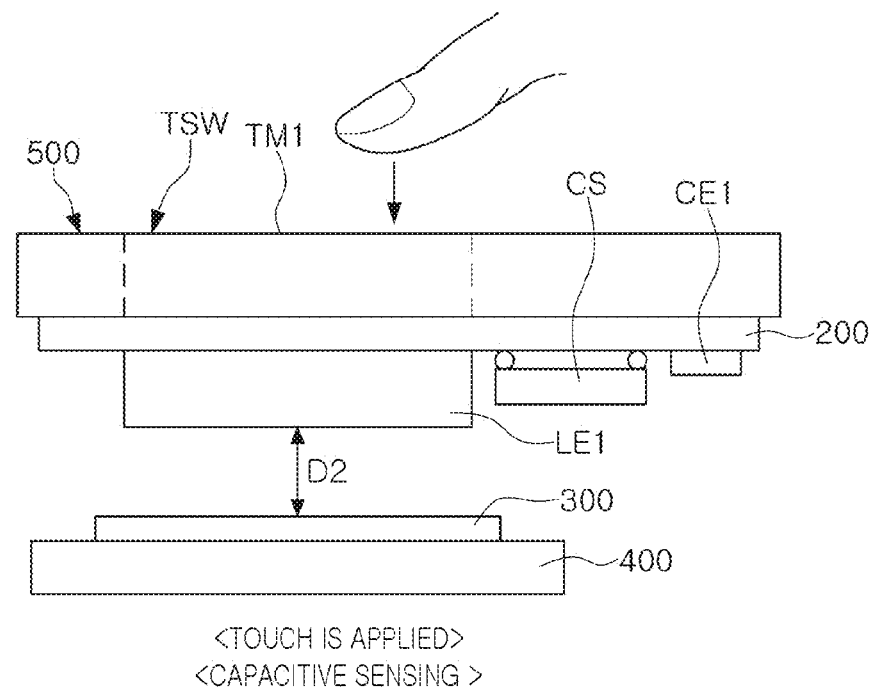
FIG. 6 is a diagram of one or more examples of a capacitive sensing concept by touch input.
Figure 7:
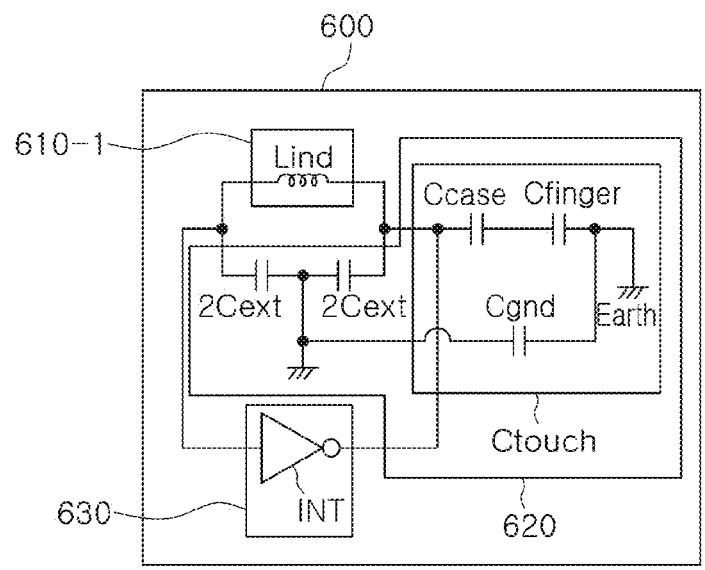
FIG. 7 is a view illustrating one or more examples of an oscillation circuit in the case of touch input.

FIG. 6 is a view of one or more examples of the capacitive sensing concept by the touch input, while FIG. 7 is a view illustrating one or more examples of an oscillation circuit in the case of the touch input.

Referring to FIGS. 6 and 7, in the operation sensing structure illustrated in FIG. 6, when the touch is input to the touch member TM1 by a conductor such as a human body, the operation sensing device according to an embodiment of the present disclosure performs capacitive sensing.

As illustrated in FIG. 7, when there is the touch input in the touch member TM1 by the conductor such as the human body, the capacitance circuit 620 of the oscillation circuit 600 may include touch capacitance Ctouch (Ccase, Cfinger, Cgnd) formed in the case of a touch, by including the capacitance Cext (2Cext and 2Cext) of the capacitor element CE1.

For example, when the touch is input through the touch member TM1, the capacitance is changed due to the interaction among the touch member TM1, the capacitor element CE1, and the touch object (for example, a human body). Accordingly, the oscillation circuit 600 may generate an oscillating signal LCosc having a first frequency change characteristic.

For example, the first frequency change characteristic will be described later with reference to FIG. 15.

Figure 8:
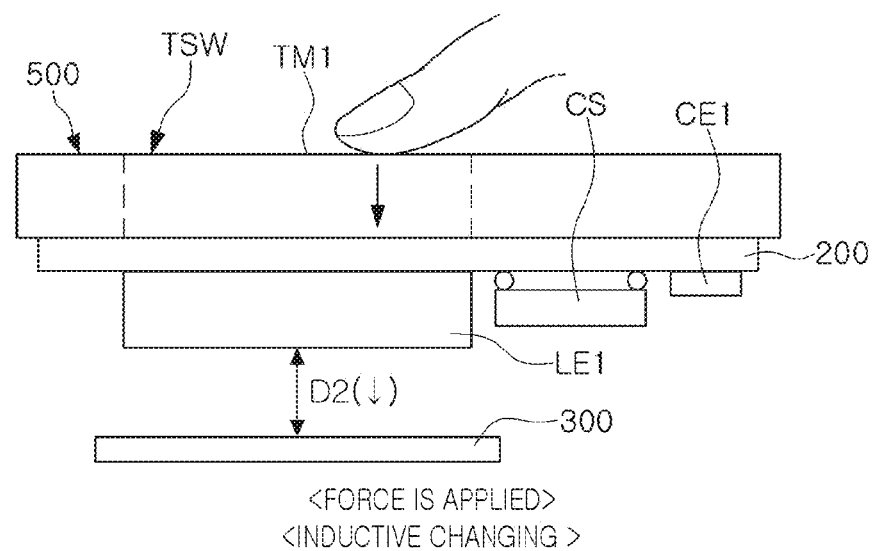
FIG. 8 is a diagram of one or more examples of an inductive sensing concept by force input.
Figure 9:
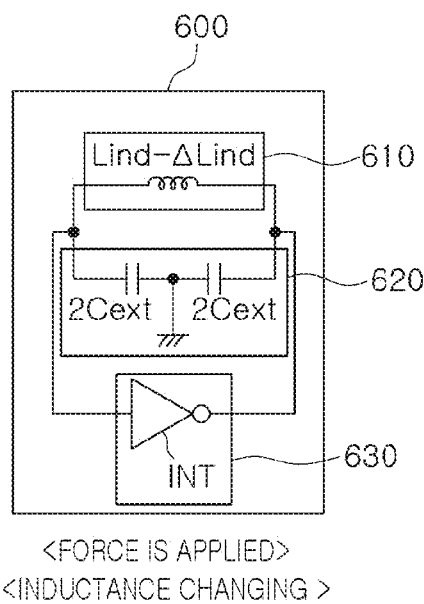
FIG. 9 is a view illustrating one or more examples of an oscillation circuit in the case of force input.

FIG. 8 is a view of one or more examples of the inductive sensing concept by the force input, while FIG. 9 is a view illustrating one or more examples of an oscillation circuit in the case of the force input.

Referring to FIGS. 8 and 9, in an embodiment of the present disclosure, when the pressing force is applied to a contact surface of the touch member TM1 of the housing 500 of the electrical device, inductive sensing may be performed. Accordingly, the force input may be detected through the touch member TM1.

Referring to FIG. 8, when the pressing force by a conductor or a non-conductor is applied to the touch member TM1, the touch member TM1 is pressed to be bent inwardly, and thus a distance between the inductor element LE1 and the conductor 300, disposed in the touch member TM1 through the substrate, is changed. Moreover, while a current flows in the inductor element LE1, the distance between the conductor 300 and the touch member TM1 is changed to generate an eddy current. Thus, the inductance by the eddy current is decreased (Lind-ΔLind), and thus the resonant frequency (the sensing frequency) is increased, and the force may be detected based thereon.

For example, when the force is applied through the touch member TM1, the inductance is changed due to the interaction among the touch member TM1, the inductor element LE1, and the conductor 300. Accordingly, the oscillation circuit 600 may generate an oscillating signal LCosc having a second frequency change characteristic.

For example, the second frequency change characteristic will be described later with reference to FIG. 16.

Moreover, referring to FIGS. 5 to 9, when the touch-force is input through the touch member TM1, due to the interaction among the touch member TM1, the inductor element LE1, the capacitor element CE1, the conductor 300, and the touch object (for example, a human body), the capacitance is changed and the inductance is changed. Accordingly, the oscillation circuit 600 may generate an oscillating signal LCosc having a third frequency change characteristic. For example, the third frequency change characteristic will be described later with reference to FIG. 17.

As described previously, by using a structure of a single touch sensing device, both the touch input and the touch-force input may be distinguished and detected. The distinguishing and recognizing operation will be described below.

Figure 10:
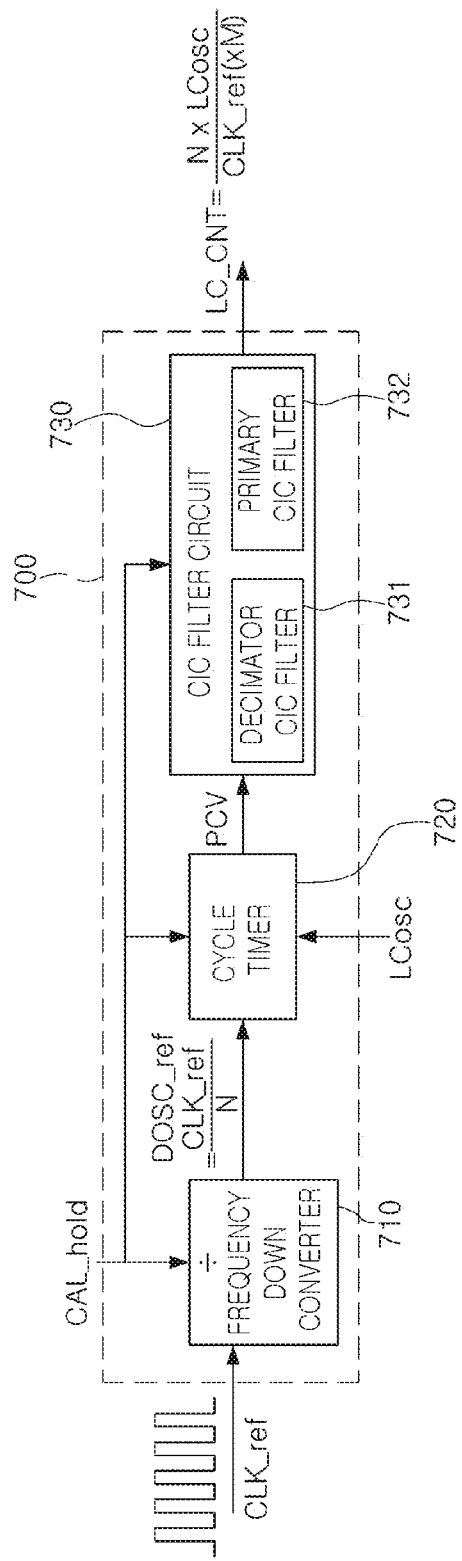
FIG. 10 is a view illustrating one or more examples of a digital frequency converter.

FIG. 10 is a view illustrating one or more examples of a digital frequency converter.

Referring to FIG. 10, the digital frequency converter 700 may generate a divided reference clock signal (DOSC_ref=CLK_ref/N) by dividing a reference clock signal CLK_ref using a reference frequency divide ratio N, and may generate a count value LC_CNT by counting the divided reference clock signal DOSC_ref using the oscillating signal LCosc.

For example, as shown in Equation 2 below, the digital frequency converter 700 divides the oscillating signal LCosc using a sensing frequency divide ratio M, and divides the reference clock signal CLK_ref using a reference frequency divide ratio N, and thus the divided reference clock signal (DOSC_ref=(CLK_ref)/N) is counted using the divided oscillating signal (LCosc/M).

Moreover, on the contrary, the divided oscillating signal may be counted using the divided reference clock signal.

$$LC\_CNT=(N\times LCosc)/(M\times CLK\_ref) \quad \text{Equation 2}$$

In Equation 2, LCosc is a frequency (oscillation frequency) of an oscillating signal, CLK_ref is a frequency of a reference clock signal, N is a reference frequency divide ratio, and M is an oscillation frequency divide ratio.

As shown in Equation 2 above, obtaining a count value by counting a reference frequency CLK_ref using an oscillation frequency LCosc has advantages in that it is possible to use a reference clock signal CLK_ref having a low frequency, it is possible to increase the accuracy of count, and a relatively expensive clock generator for generating a high frequency is unnecessary.

For example, referring to FIG. 10, the digital frequency converter 700 includes a frequency down converter 710, a cycle timer 720, and a cascaded integrated comb (CIC) filter circuit 730.

The frequency down converter 710 may generate a divided reference clock signal (DOSC_ref=CLK_ref/N) by dividing a reference clock signal CLK_ref using a reference frequency divide ratio N.

The cycle timer 720 may generate a cycle count value PCV by counting the cycle time of the divided reference clock signal DOSC_ref, received from the frequency down converter 710, using the oscillating signal LCosc.

The CIC filter circuit 730 may generate a count value LC_CNT by performing accumulated amplification on the cycle count value PCV received from the cycle timer 720.

The CIC filter circuit 730 may include a decimator CIC filter generating the count value LC_CNT by performing accumulated amplification on the cycle count value PCV received from the cycle timer 720. The decimator CIC filter may determine the cumulative gain based on the preset integral stage order, decimator factor, and comb differential delay order.

For example, the CIC filter circuit 730 includes the decimator CIC filter 731 and a first-order CIC filter 732.

The decimator CIC filter 731 may output a count value LC_CNT by performing amplification using a cumulative gain on the received cycle count value LC_CNT.

For example, when the decimator CIC filter 731 includes an integral circuit, a decimator, and a differential circuit, the cumulative gain may be obtained as $(R\times M)^S$ based on the stage order S of the integral circuit, the decimator factor R, and the delay order M of the differential circuit. For example, when the stage order S of the integral circuit is 4, the decimator factor R is 1, and the delay order M of the differential circuit is 4, the cumulative gain may be provided as 256 $((1\times 4)^4)$.

The first-order CIC filter 732 may remove noise by taking a moving average corresponding to a low pass function in the count value from the decimator CIC filter.

Figure 11:
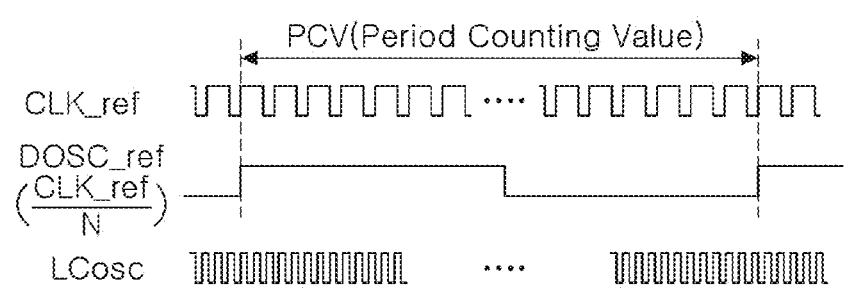
FIG. 11 is a view illustrating one or more examples of a main signal of FIG. 10.

FIG. 11 is a view illustrating one or more examples of a main signal of FIG. 10.

Referring to FIG. 11, as described previously, the reference clock signal CLK_ref is a reference signal input to the frequency down converter 710, and may be a signal due to external crystal and an oscillating signal of an IC internal phase-locked loop (PLL), resistor-capacitor (RC), or the like.

The divided reference clock signal DOSC_ref may be a signal generated by dividing the reference clock signal CLK_ref using the divide ratio N in the frequency down converter 710.

The oscillating signal LCosc is a signal generated by the oscillation circuit 600, and the frequency of the oscillating signal LCosc may be higher than the frequency of the reference clock signal CLK_ref.

Figure 12:
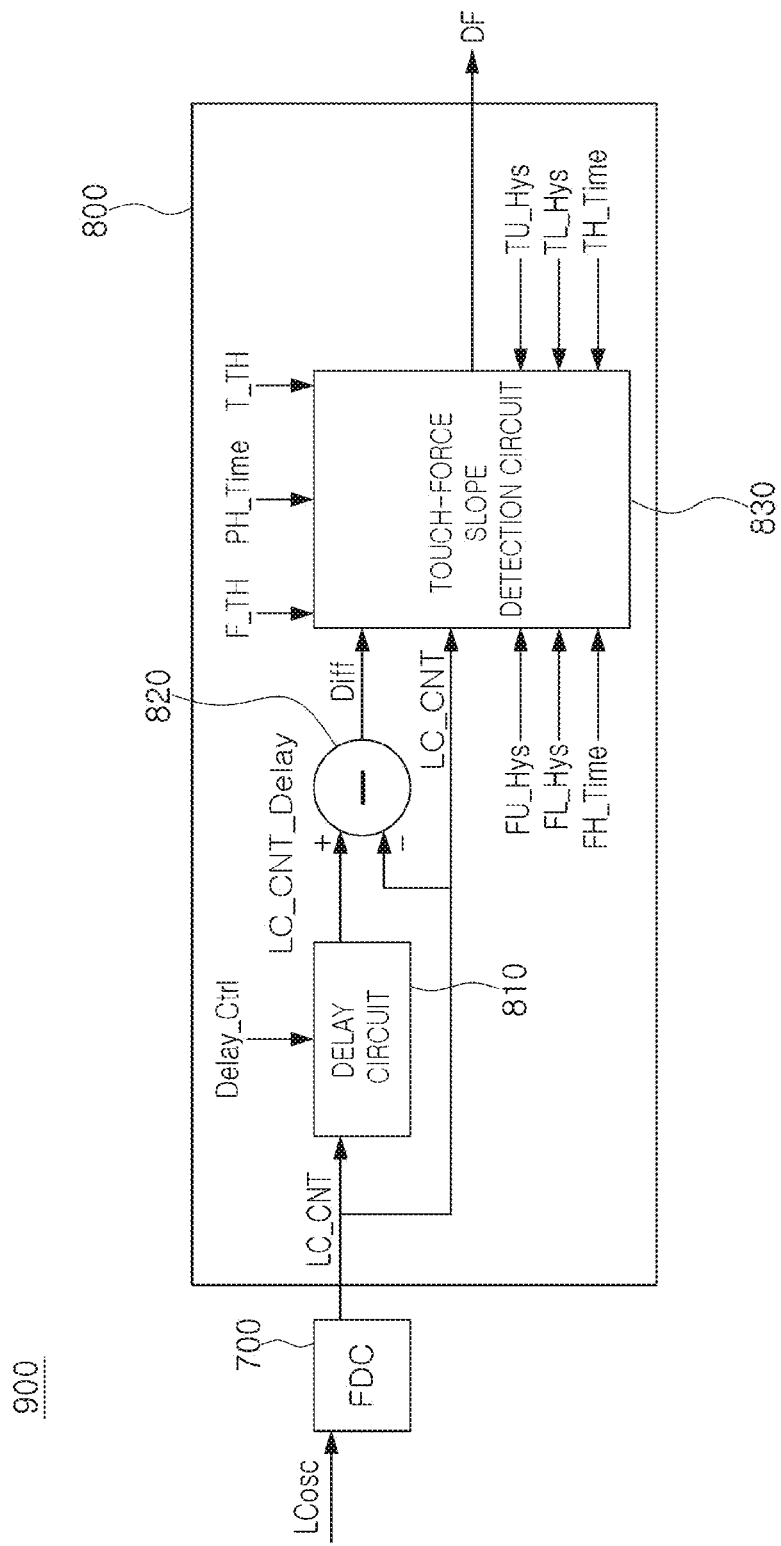
FIG. 12 is a view illustrating one or more examples of an operation detector.

FIG. 12 is a view illustrating one or more examples of an operation detector.

Referring to FIG. 12, the operation detector 800 generates a difference value Diff by differentiating the count value LC_CNT received from the digital frequency converter 700, and compares the difference value Diff with each of the preset touch threshold T_TH and the force threshold F_TH, thereby outputting a touch detection signal DF having different types of detection information based on a comparison result.

For example, the operation detector 800 may include a delay circuit 810, a subtraction circuit 820, and a touch-force slope detection circuit 830.

The delay circuit 810 may delay the count value LC_CNT, received from the digital frequency converter 700, by a time determined based on the delay control signal Delay_Ctrl, thereby outputting a delay count value LC_CNT_Delay. Here, according to the delay control signal Delay_Ctrl, the delay time may be determined.

The subtraction circuit 820 may generate a difference value Diff by subtracting the count value LC_CNT from the digital frequency converter 700, from the delay count value LC_CNT_Delay from the delay circuit 810. Here, the difference value Diff may be a slope variance of the count value LC_CNT. The count value LC_CNT corresponds to a current counted value, and the delay count value LC_CNT_Delay corresponds to a value counted previously by the predetermined delay time from the present.

The touch-force slope detection circuit 830 compares the difference value Diff, received by the subtraction circuit 820, with each of the preset touch threshold T_TH and the preset force threshold F_TH, thereby outputting a touch detection signal DF having different types of detection information based on a comparison result.

For example, the touch-force slope detection circuit 830 compares the difference value Diff for the touch-force slope output by the subtraction circuit 820, the touch sections T_TH, TU_Hys, TL_Hys, and TH_Time, and the force sections F_TH, FU_Hys, FL_Hys, and FH_Time. In this case, when the difference value Diff is less than the touch threshold T_TH, it may be recognized as a touch and a detection signal DF having first information may be output. On the other hand, when the difference value Diff is greater than the force threshold F_TH, it may be recognized as a force and a detection signal DF having second information may be output. Moreover, for a period of time, when the difference value Diff is less than the touch threshold T_TH and greater than the force threshold F_TH, it may be recognized as a touch-force and a detection signal DF having third information may be output.

For example, the first information, the second information, and the third information may have different pulse widths, but are not limited thereto.

Here, in the touch sections T_TH, TU_Hys, TL_Hys, and TH_Time, T_TH is touch threshold, TU_Hys and TL_Hys are an upper limit and a lower limit of the touch hysteresis, and TH_Time is the predetermined time for determining the touch holding time. In the force sections F_TH, FU_Hys, FL_Hys, and FH_Time, F_TH is a force threshold, FU_Hys and FL_Hys are an upper limit and a lower limit of the force hysteresis, and FH_Time is the predetermined time for determining the force holding time.

As described above, an error in a temperature drift may be prevented using the difference value Diff for the slope, and the sensing accuracy may be improved using the touch sections T_TH, TU_Hys, and TL_Hys and the force sections F_TH, FU_Hys, and FL_Hys.

Figure 13:
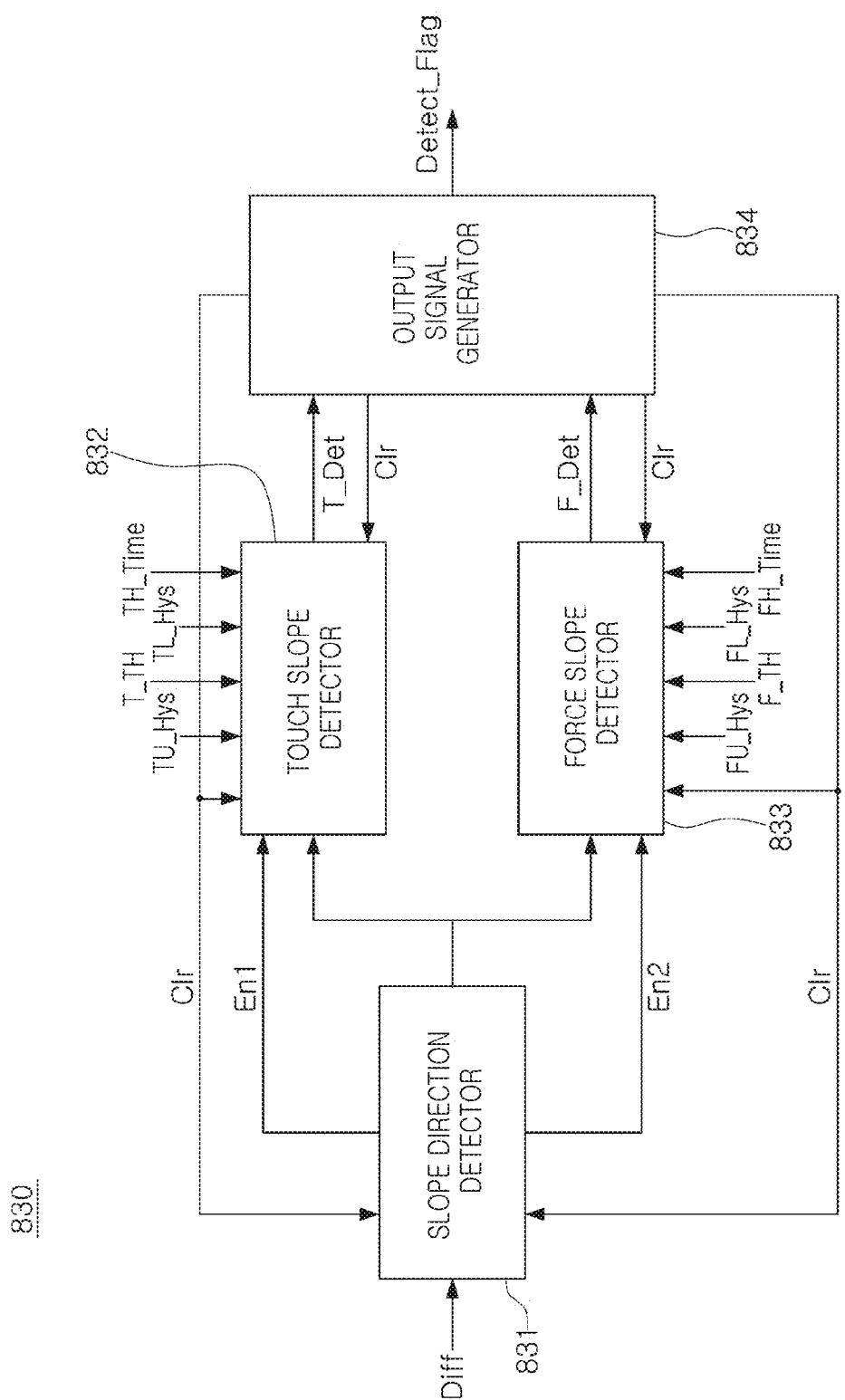
FIG. 13 is a view illustrating one or more examples of a touch-force slope detection circuit of FIG. 12.

FIG. 13 is a view illustrating one or more examples of a touch-force slope detection circuit of FIG. 12.

Referring to FIG. 13, the touch-force slope detection circuit 830 includes a slope detector 831, a touch slope detector 832, a force slope detector 833, and a detection signal generator 834.

The slope detector 831 may determine that the difference value Diff of the received slope is a falling direction, a rising direction, or rising after falling.

For example, the slope detector 831 may output a first enable signal (En1=1) in an active state in the case of falling, or may output a second enable signal (En2=1) in an active state in the case of rising, by determining whether the difference value Diff is falling or rising.

The touch slope detector 832 may generate a touch detection signal T_Det in the case in which the difference value Diff becomes a value equal to or less than a touch threshold T-TH of the falling sections T_TH, TU_Hys, and TL_Hys during the predetermined time TH_Time, when the first enable signal En1 is in an active state (En1=1). For example, the touch slope detector 832 may generate an output signal T_Det in the case in which the received difference value becomes a value equal to or less than a touch threshold T-TH of the certain sections T_TH, TU_Hys, and TL_Hys during the predetermined time TH_Time, when the enable signal is in a high active state (Enb=1). Otherwise, the touch slope detector 832 may generate an initialization signal Clr.

The force slope detector 833 may generate a force detection signal F_Det in the case in which the difference value Diff becomes a value equal to or greater than a force threshold F-TH of the rising sections F_TH, FU_Hys, and FL_Hys during the predetermined time FH_Time, when the second enable signal En2 is in an active state (En2=1). For example, the force slope detector 833 may generate an output signal F_Det in the case in which the received difference value becomes a value equal to or greater than a force threshold F-TH of the certain sections F_TH, FU_Hys, and FL_Hys during the predetermined time FH_Time, when the enable signal is in a high active state (Enb=1). Otherwise, the force slope detector may generate an initialization signal Clr.

The detection signal generator 834 may generate a touch detection signal DF having different types of detection information based on the touch detection signal T_Det and the force detection signal F_Det.

For example, in a process of generating the touch detection signal DF, the touch detection signal may be generated based on whether the touch detection signal T_Det and the force detection signal F_Det are individually or simultaneously activated and an activation time interval PH_Time of the signals T_Det and F_Det.

For example, the detection signal generator 834 may generate a touch detection signal DF including detection information corresponding to a touch input when the difference value Diff has a first frequency change characteristic, for example, rising after falling (see FIG. 15), based on the touch detection signal T_Det and the force detection signal F_Det.

Moreover, the detection signal generator 834 may generate a touch detection signal DF including detection information corresponding to a force input when the difference value Diff has a second frequency change characteristic, for example, falling after rising (see FIG. 16), based on the touch detection signal T_Det and the force detection signal F_Det.

In addition, the detection signal generator 834 may generate a touch detection signal DF including detection information corresponding to a touch-force input when the difference value Diff has a third frequency change characteristic, for example, falling, rising, and falling (see FIG. 17), based on the touch detection signal T_Det and the force detection signal F_Det.

Then, when generation of the touch detection signal DF is completed, the detection signal generator 834 may generate and provide the initialization signal Clr to the slope detector 831, the touch slope detector 832, and the force slope detector 833.

Figure 14:
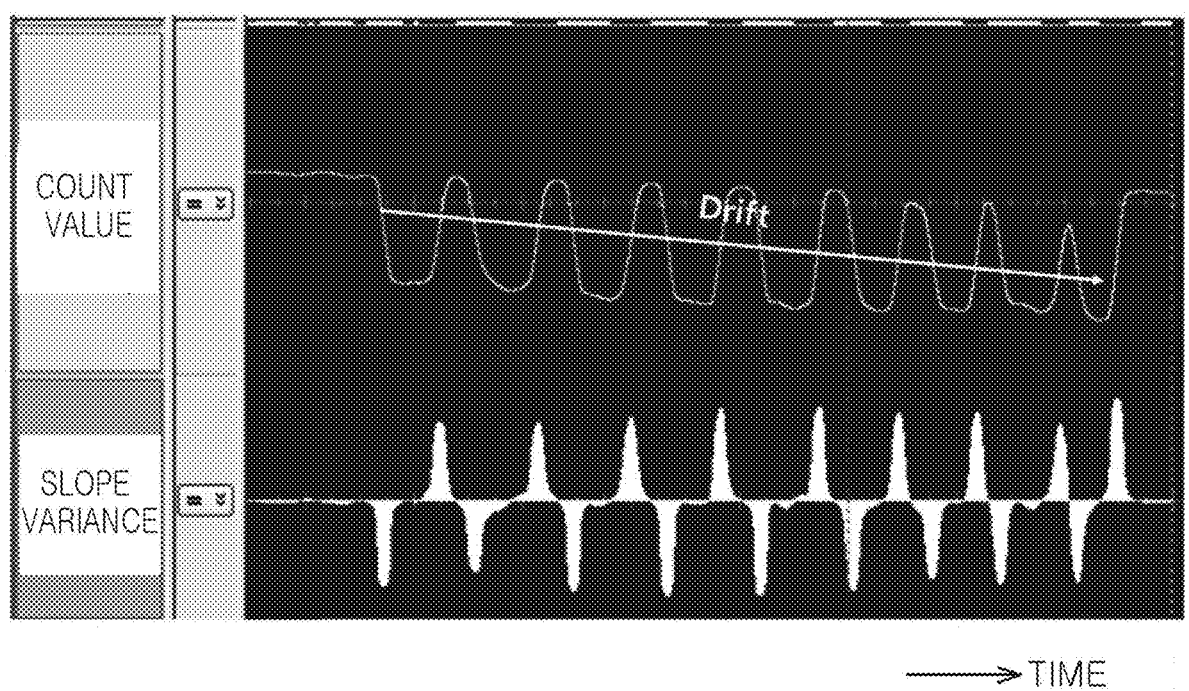
FIG. 14 is a view illustrating an example of drift of a count value in the case of touch input and a slope variance.

FIG. 14 is a view illustrating an example of drift of a count value in the case of touch input and a change in slope.

Referring to FIG. 14, a temperature change of an inductor element occurs through a touch member when a human body (for example, a hand) is continuously in contact with a touch member, and a falling drift of a counter value due to the temperature change may occur. For this reason, when a slope variance is used to determine whether there is contact without using absolute counter level, an effect caused by the temperature drift may be excluded.

Accordingly, the change of the slope in an initial state in the case of contact by the human body, for example, a hand, has first and second frequency change characteristics corresponding to falling-rising or rising-falling.

Moreover, when a slope variance is performed while the touch and the force are mixed, all of the touch and the force have a third frequency change characteristic corresponding to one shape, including a touch slope and a force slope, that is, falling, rising, and falling.

Figure 15:
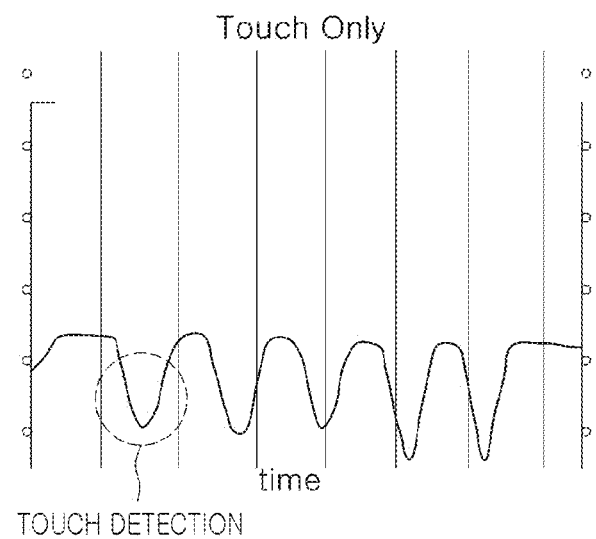
FIG. 15 is a view illustrating an example of a count value showing a first frequency change characteristic due to touch only.
Figure 16:
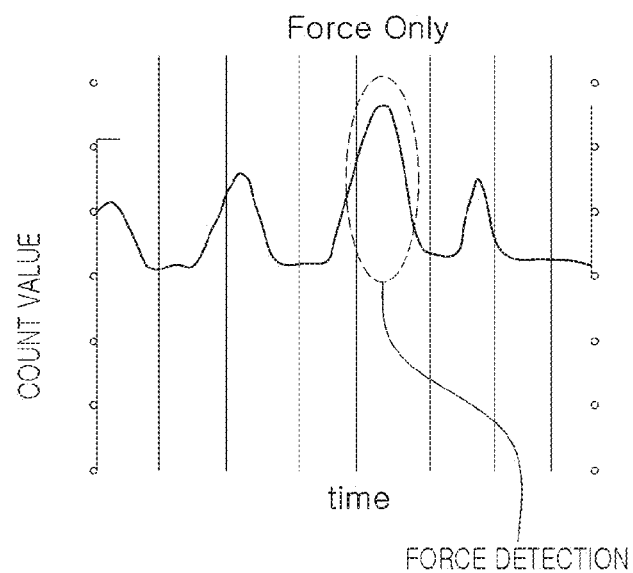
FIG. 16 is a view illustrating an example of a count value showing a second frequency change characteristic due to force only.
Figure 17:
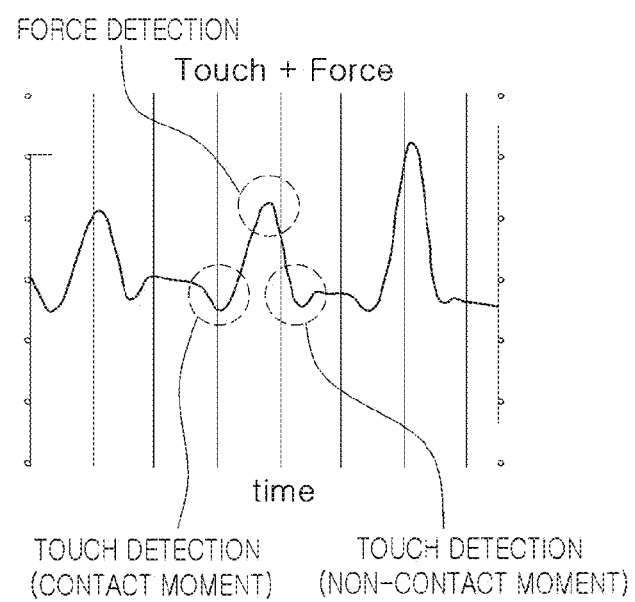
FIG. 17 is a view illustrating an example of a count value showing a third frequency change characteristic due to touch-force.

FIG. 15 is a view illustrating an example of a count value showing a first frequency change characteristic by touch only, FIG. 16 is a view illustrating an example of a count value showing a second frequency change characteristic by force only, and FIG. 17 is a view illustrating an example of a count value showing a third frequency change characteristic by touch-force only.

Referring to FIGS. 15 to 17, a method of distinguishing a touch and a force using a single inductor element will be described. FIG. 15 illustrates a waveform measured when a conductor such as a human body is close to or touches lightly an inductor element disposed in a touch member of a housing. FIG. 16 illustrates a waveform measured in the case in which a force operation is only performed while a touch operation does not occur, when a non-conductor, rather than a conductor, is in contact with the inductor element. Moreover, FIG. 17 illustrates a waveform measured in the case in which the touch and the force are performed sequentially when the conductor such as a human body touches the inductor element lightly first, and then presses the inductor element with more and more force.

For example, referring to FIG. 15, during a touch only operation, a count value, sensed by performing capacitive sensing, is reduced. Moreover, when the hand is pulled out (touch is disengaged), it is confirmed that the count value is increased to an original state. When a slope value is confirmed based on this phenomenon, a first frequency change characteristic may be confirmed, which is falling in the case of contact and rising in the case of non-contact. That is, a frequency is falling, and then rising.

Referring to FIG. 16, during a force only operation, a count value, sensed by performing inductive sensing, is increased. Moreover, when a contact material is pulled out (force is disengaged), the count value is reduced to an original state. That is, a second frequency change characteristic may be confirmed, in which a frequency is rising, and then falling.

Referring to FIG. 17, the touch and the force are performed simultaneously by a conductor such as a human body. In this case, when the conductor is near a contact surface or touches a contact surface slightly, a touch operation (capacitive sensing) is performed to reduce a counter value. Then, when a certain amount of power is applied to the conductor to allow the touch member to be bent inwardly, the touch member is close to the inductor element, so a force operation (inductive sensing) is performed to allow the counter value to be falling-rising, and falling. That is, a third frequency change characteristic is confirmed in which the frequency is falling-rising-falling.

When an embodiment of the present disclosure as described herein is applied to an electrical device, a thinner, simpler, and cleaner design may be implemented, an analog-to-digital converter (ADC) is not required in a manner different from capacitive sensing, and an application structure may be directly attached to a target surface of a touch member, so it may be easily implemented without a spacer structure. Moreover, a dustproof and waterproof switch may be implemented, and sensing may be performed even in a humid environment in a manner different from a conventional switch.

Figure 18:
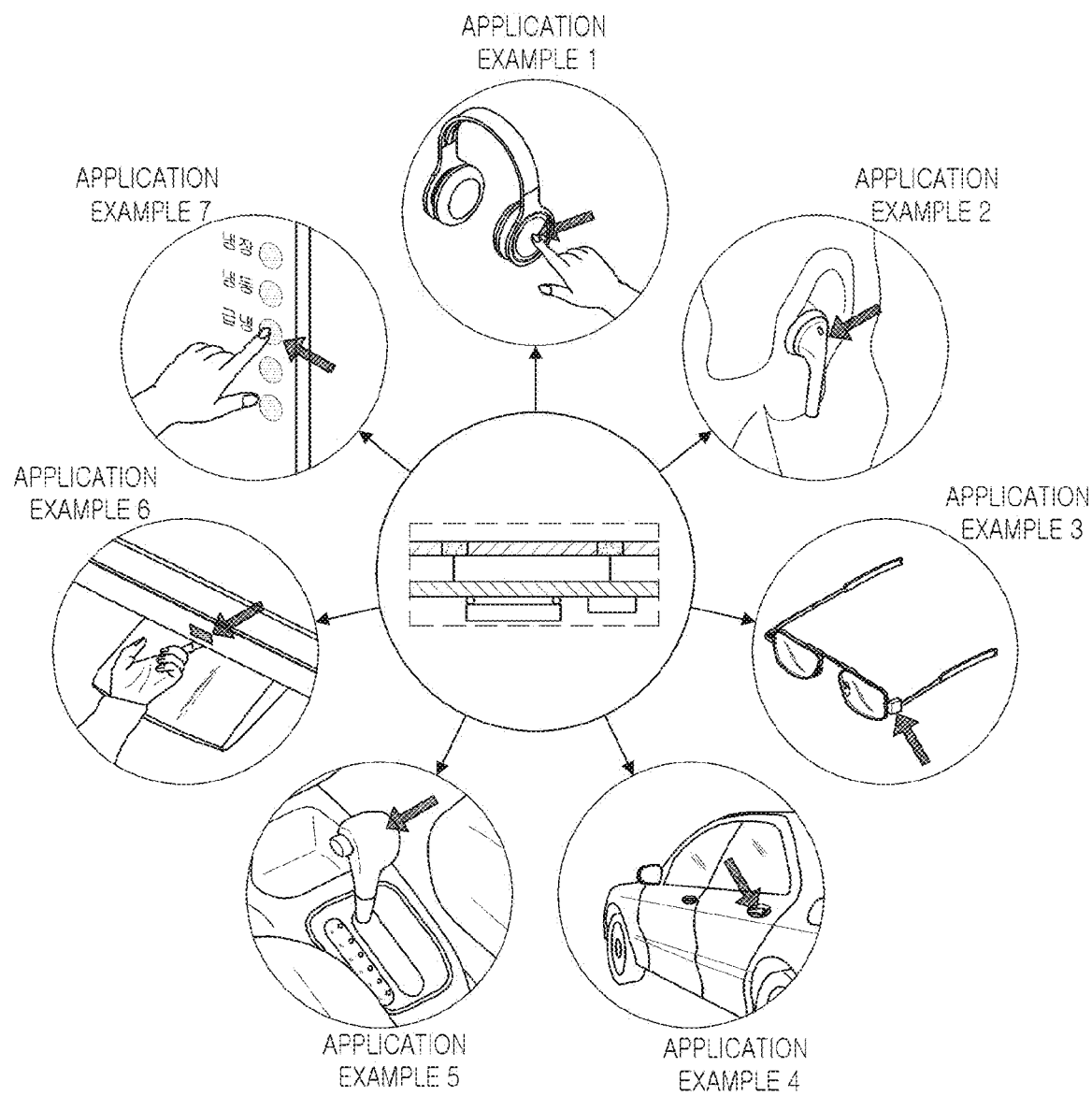
FIG. 18 is a view illustrating one or more examples of applications of a touch sensing device.

FIG. 18 is a view illustrating one or more examples of the applications of a touch sensing device.

Referring to FIG. 18, a plurality of application examples 1 to 7 of a touch operation sensing device according to embodiments of the present disclosure are shown.

The application example 1 of FIG. 18 is an example in which a touch operation sensing device is applied as an operation control button of a Bluetooth® headset, while the application example 2 of FIG. 18 is an example in which a touch operation sensing device is applied as an operation control button of a Bluetooth® earset. As an example, the touch operation sensing device may be applied as an on/off power switch of the Bluetooth® headset and the Bluetooth® earphone.

The application example 3 of FIG. 18 is an example in which a touch operation sensing device is applied as an operation control button of smart glasses. As an example, a touch operation sensing device may be applied as a button performing functions such as phone, mail, and home buttons of devices such as Google Glass, virtual reality (VR), augmented reality (AR), and the like.

The application example 4 of FIG. 18 is an example in which a touch operation sensing device is applied as a door lock button of a vehicle. The application example 5 of FIG. 18 is an example in which a touch operation sensing device is applied as a button of a smart key of a vehicle. The application example 6 of FIG. 18 is an example in which a touch operation sensing device is applied as an operation control button of a computer. Moreover, the application example 7 of FIG. 18 is an example in which a touch operation sensing device is applied as an operation button for operation control of a refrigerator.

In addition, examples of a touch operation sensing device may be applied as laptop volume and power switches, switches of VR, head mounted display (HMD), Bluetooth® earphones, stylus touch pens, and the like, and a touch operation sensing device may be applied as buttons for monitors, refrigerators, laptops, elevators, vehicles, aircraft, and the like.

For example, an operation control button may be integrated with a cover of an applied device, a frame, or a housing, and may be used to perform power on/off, volume control, color control (brightness, contrast, position, focus, hue, saturation, etc.) and other specific features (back, home, lock, etc.).

Moreover, when the corresponding functions (back, home, lock, etc.) are formed, a plurality of touch switches may be included to perform a plurality of functions. Moreover, one touch operation sensing device may be included to perform a plurality of functions (back, home, lock, etc.), for example, by distinguishing between touch, force, and touch-force.

The touch operation sensing device according to an embodiment of the present disclosure is not limited to the one or more examples of the devices described above, and may be applied to mobile and wearable devices as a switch. Moreover, a touch switch according to an embodiment of the present disclosure may be applied to implement an integrated design.

As set forth above, in conventional devices, corresponding coil sensors (for example, inductor elements) are disposed for touch sensing and force sensing, respectively, but the touch operation sensing device according to the one or more examples as described herein solve this problem.

According to the touch operation sensing device according to the one or more examples as described herein, the capacitive sensing using capacitor characteristics which a human body has in the case of touch input, and the inductive sensing using a change in an eddy current by a distance change between the inductor element and the conductor are implemented using a single sensor structure, thereby recognizing both of the touch input and the touch-force input.

In addition, a bracket supporting a conductor disposed inside a housing may be used to maintain a predetermined second distance D2 between an inductor element and a conductor more reliably, and thus the inductive sensing and the capacitive sensing are possible. Moreover, since the inductor element, the capacitor element, and the circuit unit are not directly attached to the housing, when a defect of a component occurs such as an inductor element, a capacitor element, a circuit unit, or the like, the component may be easily replaced.

In addition, the bracket described above is used to maintain a constant distance between the inductor element and the conductor inside, and thus tolerances in a manufacturing process are reduced to increase the accuracy of the inductive sensing and to increase the yield.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A touch sensing device to be applied to an electronic device having a touch operator including a touch member disposed in a housing, the touch sensing device comprising:
    a substrate disposed on an inner side surface of the touch member;
    an inductor element disposed inside the touch member on a surface of the substrate opposite the inner side surface of the touch member;
    a conductor disposed inside the housing, spaced apart from the housing by a predetermined first distance, and spaced apart from the inductor by a predetermined second distance;
    an oscillation circuit comprising the inductor element, and configured to generate an oscillating signal comprising different frequency change characteristics for each of a touch input and a touch-force input through the touch member; and
    an operation detection circuit configured to detect one or more of the touch input and the touch-force input in response to the frequency change characteristics of the oscillating signal from the oscillation circuit.

2. The touch sensing device of claim 1, wherein the oscillation circuit comprises:
    an inductance circuit comprising the inductor element;
    a capacitance circuit comprising a capacitor element disposed on the substrate and connected to the inductance circuit; and
    an amplification circuit configured to generate an oscillating signal comprising a resonant frequency by the inductance circuit and the capacitance circuit.

3. The touch sensing device of claim 1, wherein the conductor is disposed on a bracket disposed inside the housing.

4. The touch sensing device of claim 1, wherein the oscillation circuit is configured to generate the oscillating signal comprising a first frequency change characteristic according to a change in capacitance in touch input through the touch member, and configured to generate an oscillating signal comprising a second frequency change characteristic according to the change in capacitance and a change in inductance in touch-force input through the touch member.

5. The touch sensing device of claim 1, wherein the operation detection circuit comprises:
    a digital frequency converter configured to generate a count value by counting a clock signal using the oscillating signal from the oscillation circuit; and
    an operation detector configured to detect one or more of a touch input and a touch-force input in response to the count value input by the digital frequency converter.

6. The touch sensing device of claim 5, wherein the digital frequency converter comprises:
    a frequency down converter configured to generate a divided reference clock signal by dividing a reference clock signal using a reference frequency divide ratio;
    a cycle timer configured to generate a cycle count value by counting one cycle time of the divided reference clock signal, received by the frequency down converter, using the oscillating signal; and
    a cascaded integrator comb (CIC) filter circuit configured to generate the count value by performing accumulated amplification on the cycle count value received by the cycle timer.

7. The touch sensing device of claim 5, wherein the operation detector comprises:
    a delay circuit configured to output a delay count value, by delaying the count value, received by the digital frequency converter, by a time determined in response to a delay control signal;
    a subtraction circuit configured to output a difference value generated by subtracting the count value from the delay count value from the delay circuit; and
    a touch-force slope detection circuit configured to output a touch detection signal comprising different types of detection information in response to a comparison result, by comparing the difference value received from the subtraction circuit with each of a preset touch threshold and a preset force threshold.

8. The touch sensing device of claim 7, wherein the touch-force slope detection circuit comprises:
    a slope detector configured to output a first enable signal in an active state in response to a falling difference value, and output a second enable signal in an active state in response to a rising difference value, by determining whether the difference value is falling or rising;
    a touch slope detector configured to generate a touch detection signal in response to the difference value equal to or less than a touch threshold of a falling section for a predetermined time, when the first enable signal is in the active state;
    a force slope detector configured to generate a force detection signal in in response to the difference value equal to or greater than a force threshold of a rising section for a predetermined time, when the second enable signal is in the active state; and a detection signal generator configured to generate a touch detection signal comprising different types of detection information in response to the touch detection signal and the force detection signal.

9. A portable electronic device comprising:
the touch sensing device of claim 1;
a controller; and
a touchscreen.

10. The portable electronic device of claim 9, wherein in response to one or more of the touch input and the touch-force input, the controller is configured to implement one or more of control power, navigate content display of the touch screen, lock the portable electronic device, control volume of a speaker, and control color of the touch screen.

11. An electronic device, comprising:
a touch member integrated with a housing;
a substrate disposed on an inner side surface of the touch member;
an inductor element disposed inside the touch member on a surface of the substrate opposite the inner side surface of the touch member;
a conductor disposed inside the housing, spaced apart from the housing by a predetermined first distance, and spaced apart from the inductor by a predetermined second distance;
an oscillation circuit comprising the inductor element, and generating an oscillating signal comprising different frequency change characteristics for each of a touch input and a touch-force input through the touch member; and
an operation detection circuit detecting one or more of the touch input and the touch-force input in response to the frequency change characteristics of the oscillating signal from the oscillation circuit.

12. The electronic device of claim 11, wherein the oscillation circuit comprises:
an inductance circuit comprising the inductor element;
a capacitance circuit comprising a capacitor element disposed on the substrate and connected to the inductance circuit; and
an amplification circuit configured to generate an oscillating signal comprising a resonant frequency by the inductance circuit and the capacitance circuit.

13. The electronic device of claim 11, wherein the conductor is disposed on a bracket disposed inside the housing.

14. The electronic device of claim 11, wherein the oscillation circuit is configured to generate the oscillating signal comprising a first frequency change characteristic according to a change in capacitance in touch input through the touch member, and configured to generate an oscillating signal comprising a second frequency change characteristic according to the change in capacitance and a change in inductance in touch-force input through the touch member.

15. The electronic device of claim 11, wherein the operation detection circuit comprises:
a digital frequency converter configured to generate a count value by counting a clock signal using the oscillating signal from the oscillation circuit; and
an operation detector configured to detect one or more of a touch input and a touch-force input in response to the count value input by the digital frequency converter.

16. The electronic device of claim 15, wherein the digital frequency converter comprises:

a frequency down converter configured to generate a divided reference clock signal by dividing a reference clock signal using a reference frequency divide ratio;
a cycle timer configured to output a cycle count value generated by counting one cycle time of the divided reference clock signal, received by the frequency down converter, using the oscillating signal; and
a cascaded integrator comb (CIC) filter circuit configured to output the count value generated by performing accumulated amplification on the cycle count value received by the cycle timer.

17. The electronic device of claim 15, wherein the operation detector comprises:
a delay circuit configured to output a delay count value, by delaying the count value, received by the digital frequency converter, by a time determined in response to a delay control signal;
a subtraction circuit configured to output a difference value generated by subtracting the count value from the delay count value from the delay circuit; and
a touch-force slope detection circuit configured to output a touch detection signal comprising different types of detection information in response to a comparison result, by comparing the difference value received from the subtraction circuit with each of a preset touch threshold and a preset force threshold.

18. The electronic device of claim 17, wherein the touch-force slope detection circuit comprises:
a slope detector configured to output a first enable signal in an active state in response to a falling difference value, and output a second enable signal in an active state in response to a rising difference value, by determining whether the difference value is falling or rising;
a touch slope detector configured to generate a touch detection signal in response to the difference value equal to or less than a touch threshold of a falling section for a predetermined time, when the first enable signal is in the active state;
a force slope detector configured to generate a force detection signal in in response the difference value equal to or greater than a force threshold of a rising section for a predetermined time, when the second enable signal is in the active state; and
a detection signal generator configured to generate a touch detection signal comprising different types of detection information in response to the touch detection signal and the force detection signal.

19. A portable electronic device comprising:
the touch sensing device of claim 11;
a controller; and
a touchscreen.

20. The portable electronic device of claim 19, wherein in response to one or more of the touch input and the touch-force input, the controller is configured to implement one or more of control power, navigate content display of the touch screen, lock the portable electronic device, control volume of a speaker, and control color of the touch screen.

* * * * *